United States Patent [19]

Günthner

[11] Patent Number: 4,515,621
[45] Date of Patent: May 7, 1985

[54] SHEET ROLLING MACHINE

[75] Inventor: Frantz Günthner, Mainz-Lerchenberg, Fed. Rep. of Germany

[73] Assignee: JENAer Glaswerk, Schott & Gen., Mainz, Fed. Rep. of Germany

[21] Appl. No.: 572,079

[22] Filed: Jan. 19, 1984

[30] Foreign Application Priority Data

Jan. 27, 1983 [DE] Fed. Rep. of Germany ....... 3302664

[51] Int. Cl.$^3$ .............................................. C03B 13/16
[52] U.S. Cl. ...................................... 65/171; 65/172; 65/173; 65/193; 65/245; 65/253
[58] Field of Search ................. 65/171, 172, 173, 193, 65/253, 255, 245

[56] References Cited

U.S. PATENT DOCUMENTS 83,841  11/1868  Ferris ................................... 65/245

FOREIGN PATENT DOCUMENTS

225698  8/1958  Australia ............................... 65/253
739396  1/1933  France ................................... 65/253
294614  3/1932  Italy ..................................... 65/245

Primary Examiner—Arthur Kellogg
Attorney, Agent, or Firm—Quaintance & Murphy

[57] ABSTRACT

In a rolling machine for continuously manufacturing rolled plates of glass or glass ceramics, in which the two shaping rolls can be changed during operation without interrupting the flow of glass, the two shaping rolls together with at least one replacement roll are disposed in a respective change-over device rotatable around a shaft which is symmetrical relative to all the rolls. To enable both shaping rolls to be rapidly changed during operation, the change-over device for the top shaping roll has a device for rapidly raising and lowering the change-over device and thus raising or lowering the top shaping rolls.

5 Claims, 12 Drawing Figures

SHEET ROLLING MACHINE

DESCRIPTION

The invention relates to a rolling machine for continuously manufacturing rolled plates of plastic material, e.g. glass or glass ceramic, comprising two shaping rolls which can be replaced during operation without interrupting the flow of material.

When plastic material, e.g. glass, is rolled, the shaping rolls, which are generally made of cast iron or steel, are subject to deterioration, e.g. by oxidation or damage to the surface. This also damages the surface of the shaped material. For quality reasons, the deterioration must be kept within certain limits, and consequently the shaping rolls must frequently be changed. When manufacturing ornamental glass, a change may also be necessary when the ornamentation is varied. The resulting stoppage must be very short, particularly when shaping materials which easily crystallise at relatively high temperatures (e.g. 1350° C.). In the special case of glass ceramics, the flow of material must not be interrupted at all, even for a short time, since the apparatus will block up completely and be very expensive to return to operation.

It has, therefore, already been proposed to provide a glass-rolling mill with a number of working rolls replaceable during the rolling process and concentrically mounted in a common rotary frame (German PS No. 563 419), the operating surface of the working rolls projecting only slightly from the generatrix of the rotary frame. This proposal, however, is impracticable, because a gap has to be left between the generatrix of the frame and each working roll and whenever glass comes in contact therewith, it is pressed into the gap. The glass-rolling machine proposed in German PS No. 56 34 19 has, therefore, been a failure in practice.

The object of the invention is to eliminate these disadvantages and provide a device enabling both rolls to be simultaneously or successively replaced during operation, quickly and without interrupting the flow of material, without glass penetrating into the gap between the frame generatrix and the working rolls. It is a further object to provide a device such that the gap can be adjusted as required, and cooling water can be supplied to all essential parts of the claimed device continuously, even during the change-over process, and the entire change-over process can be automatically controlled, including the installation and removal of replacement rolls.

The problems of the prior art are solved by a machine of the present invention.

In the rolling machine according to the invention, the top and bottom roll are disposed in a turret head which also receives the replacement rolls. The frame bearing the top roll can rapidly be raised. Metal plates are disposed between the two bottom rolls so that the cross-section of the bottom turret head externally describes a circle from which the rolls project slightly at 180° intervals. The metal plates are divided into segments rotatably mounted round a common hinge, so that the gap between the free ends of the segments and the roll surfaces can be adjusted as required.

When the rolls are changed, the frame bearing the top roll is raised; one or both turret heads are rotated through 180° and the frame is lowered. Even when the gap between the segment ends and rolls comes in contact with the glass, the surface pressure on the top roll is relaxed according to the invention and the roll is easily raised, thus preventing glass being pressed into the gap.

The top turret head can rotate in either direction, whereas the bottom head must rotate in a direction such that its cylindrical jacket moves in the same direction as the strip of material to be shaped. The peripheral speed of the jacket is equal to the speed of the strip. The supply and discharge of coolant to and from all rolls is not interrupted during the change-over.

The plate segments also have devices for supplying and discharging cooling water; as before there is no interruption to the supply or discharge of coolant during the change-over.

The replacement rolls are installed or removed during operation, without interrupting the flow of glass. The part of the strip made unserviceable by the change of rolls is only a few meters, depending on the dimensions of the machine. The running machine bears only the shaping rolls; the feed rolls and sliding bridge, if required, are disposed on a separate frame. The machine is symmetrical, so that the material being shaped can be conveyed in either direction. Consequently, there is no need for double embodiments (left and right) when a number of machines are in operation. The device can easily be adapted to the available space, e.g. if installed at a glass-melting tank.

The machine according to the invention will now be described in detail with reference to an embodiment.

Figure 1:
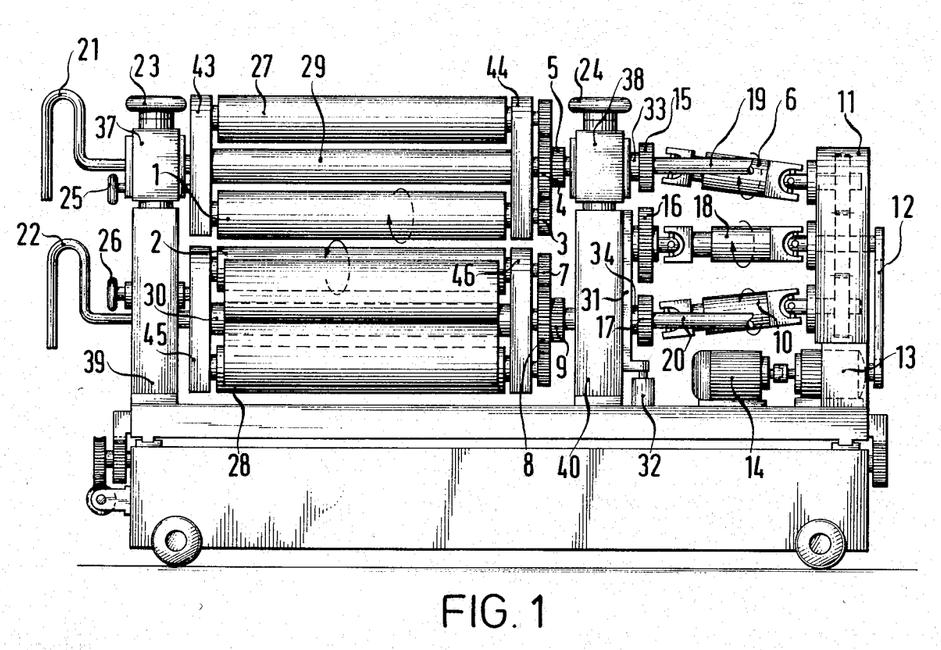
FIG. 1 is a side view of the machine with the rolls parallel to the plane of the drawing.
Figure 3:
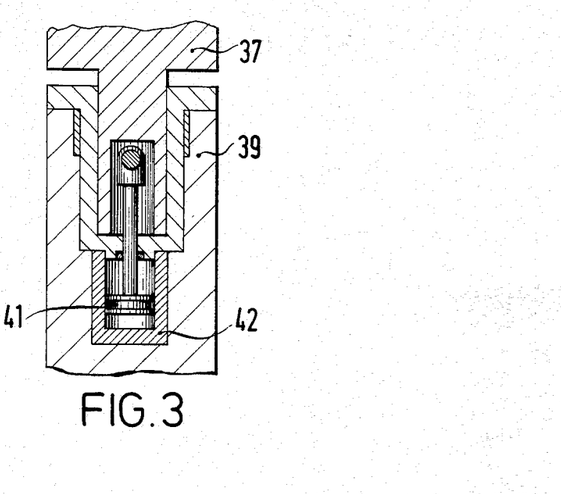
FIG. 3 shows the main features of the device for lifting the top roll frame.
Figure 4:
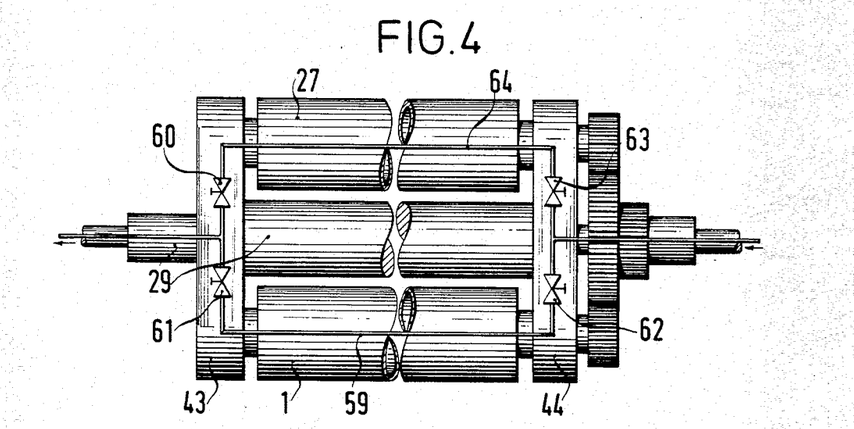
FIG. 4 shows the supply of coolant.
Figure 5:
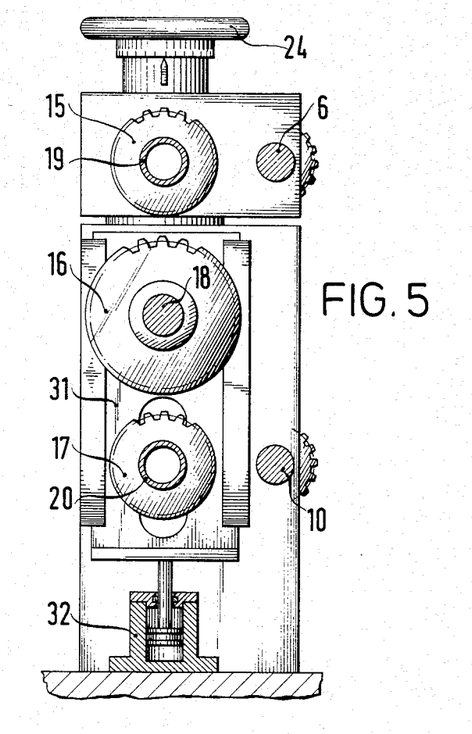
FIG. 5 is a view of the machine from the drive side.
Figure 6:
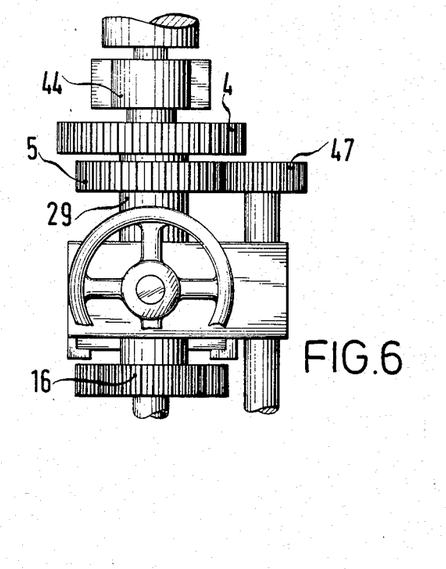
FIG. 6 is a plan view of the drive side corresponding to FIG. 5.
Figure 8:
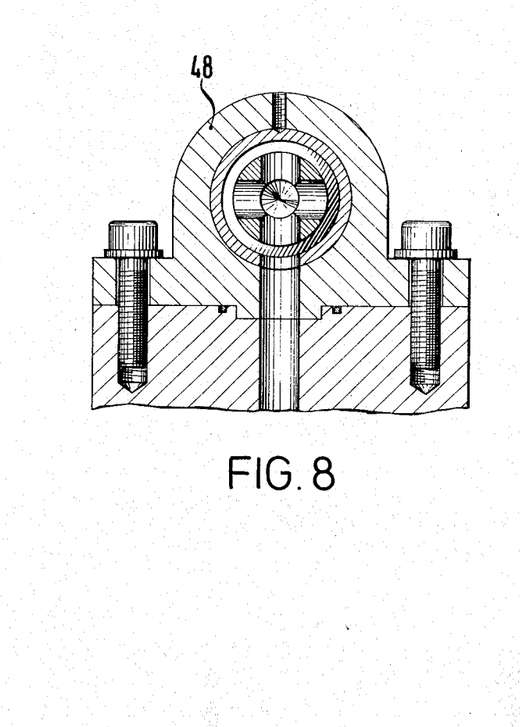

Shaping rolls 1 and 2 (FIG. 1) are driven via pinions 3, 4, 5 or 7, 8, 9, drive shafts 6 and 10, transmission 11, belt 12, transmission 13 and motor 14. They are secured to supports 43, 44, 45 and 46, which are mounted on shafts 29, 30 in frames 37, 38, 39, 40 and prevented by bolts 25, 26 from twisting. Coolant is supplied and discharged via lines 19, 20 (FIG. 1), bearing 48 (FIG. 8) and lines 21 and 22. FIG. 4 diagramatically shows the flow path of the coolant. Roller 1 is in engagement and is cooled by a flow of coolant in path 59; valves 61 and 62 are open. Roller 27 is in the ready position, valves 60, 63 are closed; path 64 is empty of coolant. During the change-over, all valves are open, so that both rolls are cooled. The cooling lines (e.g. 77, 78) of the segments (e.g. 71, 73) associated with the rolls are connected in parallel with the lines cooling the rolls. When the rolls are changed, frames 37, 38 are raised by cylinder 42 and system 41 in frames 39, 40 (FIG. 3). By means of cylinder 32 (FIG. 5) plate 31, to which pinion 16 driven by the drive shaft is fixed, is raised or lowered from a central position (determined by means not shown) with the result that pinion 15 or 17, which is non-positively secured to shaft 33 or 34, comes into engagement with pinion 16. As a result the supports 43, 44 and 45, 46 permanently secured to shaft 33, 34 are pivoted and the roll change-over is complete. Abutments (not shown), a slipping clutch and a limit switch ensure that the pivoting operation ends after reaching the operating position and the pinion 16 is uncoupled. Pinions 5, 4, which are non-positively connected and in engagement with pinion 47 (FIG. 6), are rotatably mounted on shaft 29. The outflow gap 36 (FIG. 2) is dimensioned so that not too much material flows out when the top roll is raised and during the pivoting process. Ribbed metal sheets divided into segments 71, 72 and 73, 74 and pivotably mounted on common joints 75, 76 bear the strip 35 when rolls 2 and 28 pivot around shaft 30.

Figure 7:
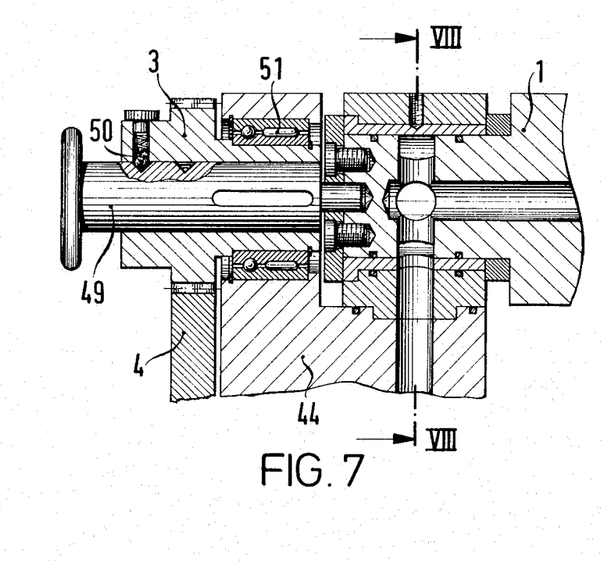
FIGS. 7 and 8 show the roll mounting, with parts of the coolant supply.

Pinion 16 is coupled via drive shaft 18 to transmission 11, so that during pivoting the peripheral speed of the metal plates is exactly the same or smaller by a given percentage than the set speed of strip 35. The latter can be increased during the change-over process. The rollers are connected to supports 43, 44, 45, 46 by bearing 48 (FIG. 8) and are non-positively secured by movable bolts 49 (FIG. 7) to a pinion 3 mounted in bearing 51. Resiliently mounted balls 50 hold bolts 49 in the engaged or disengaged position.

Figure 9:
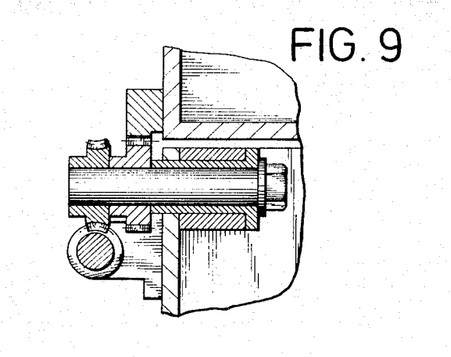
FIGS. 9–11 show the lateral adjustment with bearings and drive.
Figure 10:
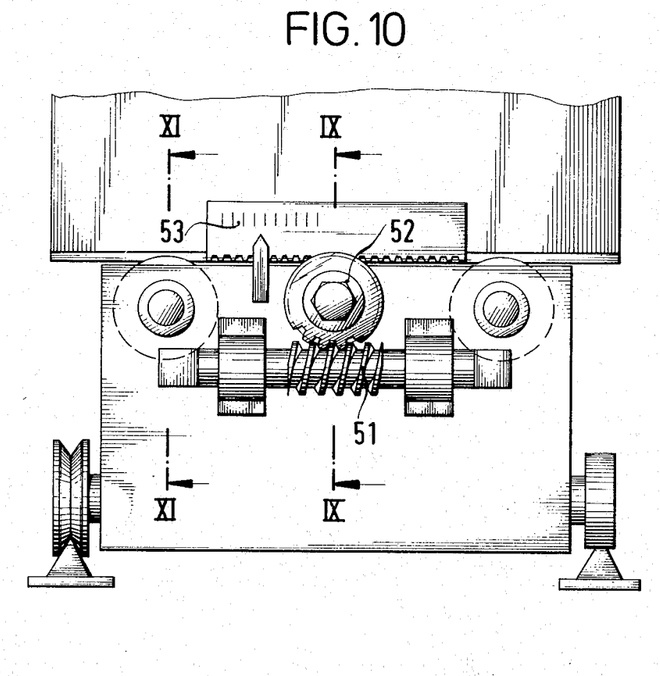
Figure 11:
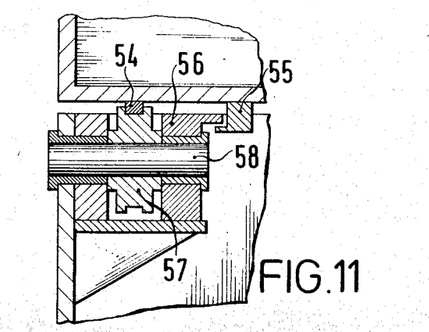
Figure 12:
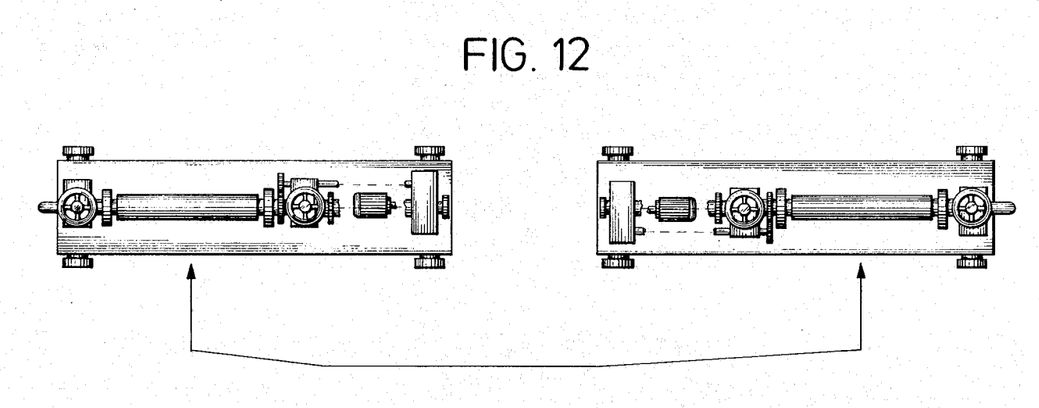
FIG. 12 shows two possible arrangements, depending on the flow direction of the material being shaped.

The thickness of strip 35 is determined by the distance between rolls 1, 2 in the operating state. The distance is adjusted by wheels 23, 24 via a screw thread (not shown). The pressure in cylinders 43 is adjustable, permitting wide variation in the force with which rollers 1, 2 are pressed onto strip 35. The top part of the machine is mounted on the bottom part via rail 54, roller 57 and bolt 58 and secured by ledges 55, 56 (FIGS. 9 and 11). Lateral adjustment is made via a worm shaft 51' and worm wheel 52, the position being indicated by a scale 53 (FIG. 10). In contrast to known embodiments, the machine can convey the material being shaped in either of two directions. The operating and drive elements are disposed so that they can be actuated or operate irrespective of the flow direction of the material being shaped.

Figure 2:
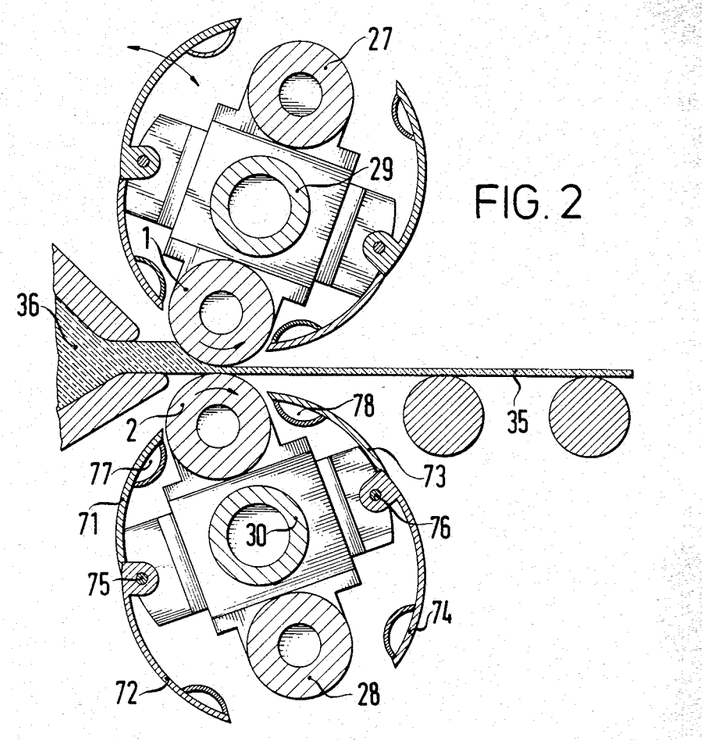
FIG. 2 shows a cross-section through the turret heads and how they are disposed relative to the outlet for material.

As FIG. 2 shows, segments 71, 72 and 73, 74 have lines 77, 78 for supplying cooling water.

The machine can also have means (not shown) for automatically performing the change-over.

What is claimed is:

1. A rolling machine for continuously manufacturing a strip of plastic material, the machine comprising an outlet gap and a pair of co-operating shaping rolls, one being disposed above and the other below the web of material for shaping, so that both rolls can be replaced independently, either simultaneously or successively by substitute rolls without the flow of material for shaping being interrupted or changed during the replacement, one roll and one replacement roll on each occasion being mounted on either side in a change-over device rotatable around a shaft disposed symmetrically with respect to the rolls, so that when the change-over device rotates, the roll axes move along the same imaginary cylinder surface without intersecting the plane of the web of material to be shaped, cylindrical metal plates being disposed between the bottom roll and the corresponding replacement roll(s) concentrically to the axis of rotation of the bottom change-over device and at a distance therefrom somewhat less than the distance from the axis to the most distant generatrix of the bottom roll, characterized in that the change-over device for the top roll is equipped with a device for rapidly raising and lowering the change-over device and consequently the top roll and characterized in that the cylindrical metal plates disposed between the bottom roll and the replacement roll are divided into segments mounted pivotably around a common joint so that the gap between the free ends of the segments and the roll surface can be adjusted as required.

2. A rolling machine according to claim 1, characterised in that the shaping rolls and replacement rolls, like the segments, have connections for supplying and discharging a coolant, so that the coolant can be sent through all the parts independently and can continue to flow through them during the change of rolls.

3. A rolling machine according to claim 1, characterised in that the shaping rolls and the change-over devices comprise switchable drives operating in either direction, so that the web of material for shaping can run through the machine in either direction.

4. A rolling machine according to claim 1, characterised by means for automatically controlling the change of rolls, except for installing and removing the replacement rolls.

5. A rolling machine for continuously manufacturing a strip of glass, the rolling machine comprising:
   A. a top change-over device, said top change-over device comprising a top roll and a top replacement roll disposed in a top turret head, said top roll and said top replacement roll being mounted diametrically opposite one another in said top turret head, said top change-over device being rotatable around a top shaft disposed symmetrically between the top roll and the top replacement roll; said top change-over device being equipped with means for rapidly raising and lowering the top change-over device and consequently the top roll; and
   B. a bottom change-over device, positioned such that a web of glass to be shaped will pass between the bottom change-over device and the top change-over device, said bottom change-over device comprising: a bottom roll and a bottom replacement roll disposed in a bottom turret head, said bottom roll and said bottom replacement roll being mounted diametrically opposite one another in said bottom turret head, said bottom change-over device being rotatable around a bottom shaft disposed symmetrically between the bottom roll and the bottom replacement roll; and
   C. cylindrical metal plates disposed between the bottom roll and the bottom replacement roll, said metal plates being concentric with an axis of rotation of the bottom change-over device and located at a distance from said axis of rotation less than the distance from the axis to a most distant generatrix of the bottom roll, said metal plates being divided into segments having free ends, said segments being mounted pivotably around a common joint such that a gap between the free ends of the segments and the bottom roll and the bottom replacement roll can be adjusted; and
   D. connections for supplying and discharging a coolant to the top roll, the top replacement roll, the bottom roll, the bottom replacement roll and the segments such that coolant can be sent through the rolls and segments independently and can continue to flow during replacement of the top roll and the bottom roll; and E. means for automatically controlling the replacement of the top roll by the top replacement roll and the replacement of the bottom roll by the bottom replacement roll;

wherein, the top roll, the bottom roll, the top change-over device and the bottom change-over device comprise switchable drives operating in two directions, such that the web of glass to be shaped can run through the machine in either direction; and wherein the top roll and the bottom roll can be replaced independently, both simultaneously and successively, by the top replacement roll and the bottom replacement roll respectively, without the flow of the web of glass being altered during the replacement of the rolls.

* * * * *